United States Patent
Bellinger et al.

(10) Patent No.: US 10,855,802 B2
(45) Date of Patent: Dec. 1, 2020

(54) SYSTEM AND METHOD OF CREATING PROVISIONAL ACCOUNT PROFILES

(71) Applicant: Microsoft Technology Licensing, LLC, Redmond, WA (US)

(72) Inventors: Kevin Bellinger, Oslo (NO); Paul Elliott, Woodinville, WA (US); Fernando Garcia Valenzuela, Oslo (NO); Kjetil Bergstrand, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 41 days.

(21) Appl. No.: 16/003,249

(22) Filed: Jun. 8, 2018

(65) Prior Publication Data

US 2019/0379759 A1    Dec. 12, 2019

(51) Int. Cl.
*H04L 29/08* (2006.01)
*G06F 16/335* (2019.01)
*G06F 16/9535* (2019.01)
*G06Q 50/00* (2012.01)
(Continued)

(52) U.S. Cl.
CPC .......... *H04L 67/306* (2013.01); *G06F 16/337* (2019.01); *G06F 16/953* (2019.01); *G06F 16/9535* (2019.01); *G06Q 50/01* (2013.01); *H04L 51/32* (2013.01); *H04L 67/025* (2013.01); *H04L 67/22* (2013.01); *H04L 67/34* (2013.01)

(58) Field of Classification Search
CPC ..... H04L 67/306; H04L 67/22; H04L 67/025; H04L 67/34; G06F 16/953
See application file for complete search history.

(56) References Cited

U.S. PATENT DOCUMENTS

| 7,330,969 B2* | 2/2008 | Harrison ................... H04L 9/30 |
| | | 713/155 |
| 8,140,502 B2* | 3/2012 | Francis ................... G06F 16/00 |
| | | 707/705 |

(Continued)

FOREIGN PATENT DOCUMENTS

CN    106991535 A    7/2017

OTHER PUBLICATIONS

"International Search Report and Written Opinion Issued in PCT Application No. PCT/US2019/034776", dated Sep. 23, 2019, 11 Pages.

*Primary Examiner* — Lashonda T Jacobs
(74) *Attorney, Agent, or Firm* — Shook, Hardy & Bacon, LLP

(57) ABSTRACT

Computing systems and processes of creating provisional account profiles of users are disclosed herein. In one embodiment, a computing system is configured to detect at least one ingoing or outgoing communication to or from a first globally unique identifier of a first user that has not already linked to an account of said service. In response to said detection, the computing system is configured to create a provisional user profile for the first user linked to the first globally unique identifier and gather public information associated with the first user from one or more third-party sources outside said service. When the first user joins said service, the computing system can be configured to allocate the provisional user profile to an account belonging to the first user linked to the first globally unique identifier.

20 Claims, 3 Drawing Sheets

(51) Int. Cl.
*H04L 12/58* (2006.01)
*G06F 16/953* (2019.01)

(56) References Cited

U.S. PATENT DOCUMENTS

| | | | | |
|---|---|---|---|---|
| 8,255,978 | B2 * | 8/2012 | Dick | G06F 16/217 |
| | | | | 726/4 |
| 8,738,714 | B2 * | 5/2014 | Setton | G06Q 10/10 |
| | | | | 709/206 |
| 8,812,404 | B2 | 8/2014 | Aleong et al. | |
| 9,323,416 | B2 * | 4/2016 | Schwend | G06F 3/0481 |
| 9,674,235 | B2 | 6/2017 | Setton et al. | |
| 10,366,090 | B2 * | 7/2019 | Shorman | G06Q 50/01 |
| 10,382,500 | B2 * | 8/2019 | Berger | H04L 65/403 |
| 2002/0052834 | A1 * | 5/2002 | Fukuda | G06Q 99/00 |
| | | | | 705/38 |
| 2003/0154180 | A1 | 8/2003 | Case et al. | |
| 2008/0222308 | A1 * | 9/2008 | Abhyanker | H04L 12/185 |
| | | | | 709/245 |
| 2009/0319329 | A1 | 12/2009 | Aggarwal et al. | |
| 2010/0049852 | A1 * | 2/2010 | Whitnah | H04L 47/783 |
| | | | | 709/226 |
| 2010/0299276 | A1 * | 11/2010 | Shahine | G06Q 50/01 |
| | | | | 705/319 |
| 2011/0004561 | A1 * | 1/2011 | Shahine | G06Q 50/01 |
| | | | | 705/319 |
| 2011/0106610 | A1 * | 5/2011 | Landis | G06Q 30/0255 |
| | | | | 705/14.39 |
| 2012/0078906 | A1 * | 3/2012 | Anand | G06Q 10/06 |
| | | | | 707/737 |
| 2013/0066962 | A1 * | 3/2013 | Scherzinger | G06Q 50/01 |
| | | | | 709/204 |
| 2013/0158984 | A1 * | 6/2013 | Myslinski | G06F 16/951 |
| | | | | 704/9 |
| 2013/0217365 | A1 * | 8/2013 | Ramnani | H04L 67/306 |
| | | | | 455/414.1 |
| 2014/0122497 | A1 | 5/2014 | Eigner et al. | |
| 2014/0258260 | A1 * | 9/2014 | Rayborn | G06F 16/951 |
| | | | | 707/707 |
| 2014/0324517 | A1 | 10/2014 | Harris | |
| 2015/0019547 | A1 * | 1/2015 | Thalapathy | G06F 16/335 |
| | | | | 707/732 |
| 2015/0324356 | A1 * | 11/2015 | Andres Gutierrez | |
| | | | | H04N 21/4532 |
| | | | | 707/734 |
| 2016/0147758 | A1 * | 5/2016 | Chhaya | G06F 16/437 |
| | | | | 707/733 |
| 2016/0180112 | A1 * | 6/2016 | Bhagwan | G06F 21/6263 |
| | | | | 726/26 |
| 2017/0316380 | A1 | 11/2017 | Swaminathan et al. | |
| 2017/0364971 | A1 * | 12/2017 | Lyons | H04L 51/02 |
| 2018/0040059 | A1 | 2/2018 | Cruz et al. | |
| 2018/0083778 | A1 * | 3/2018 | McCallum | H04L 9/14 |
| 2019/0068747 | A1 * | 2/2019 | Lervik | H04L 67/22 |

* cited by examiner

SYSTEM AND METHOD OF CREATING PROVISIONAL ACCOUNT PROFILES

BACKGROUND

Many online and computer based services require users to create an account prior to using the service. Typically this registering process also involves completing a minimum amount of an associated profile. For example, it may comprise not just providing an email address or phone number along with a password, but also providing information like date of birth, location, contacts, place of work, etc. This can be a cumbersome and time consuming step when a user simply wants to get on with using the service in question. The profile set up can be especially time consuming when the new service is the first service to be used from a provider who has a large network of services, for example the portfolio of products and services such as email, instant messaging, VoIP, online-enabled word processing, spreadsheet and slideshow applications, etc. This can be especially time consuming because in this situation no information about the new user is already available within that particular network of services.

Another issue with such services which maintain a profile alongside the account of a user is that these profiles require the user to update their information as-and-when it changes, often with each service provider individually. Again, this can be a time consuming process, and if the updating is not performed then items of information may no longer be accurate.

SUMMARY

It has been recognized that often a new user of a service will know one or more other people who already use that service, and thus the existing users will have an account and associated profile with the service. These existing users of the service may therefore possess a certain amount of information about the new user. This currently unaffiliated information can thus be accessed prior to that new user joining the service. When this information is uniquely identifiable, such as a phone number or an email address, it can be used as seed information around which a provisional user profile may be built. This profile may be built before the new user has claimed to be the owner of the information by opening or registering for an account. In this way a provisional profile may be created using private information crowd sourced from contacts of the new user. That provisional profile may then already exist, filled in and available to be claimed by the new user, when the new user eventually chooses to create an account.

According to one aspect disclosed herein, there is provided a method of generating a provisional user profile for an account in an account database, the accounts database comprising accounts of a communication service that is implemented over a network, wherein each account is linked to at least one globally unique identifier, the method comprising: detecting at least one ingoing or outgoing communication to or from a first globally unique identifier of a first user, the first globally unique identifier not already linked to an account of said service; in response to said detection, creating a provisional user profile for the first user linked to the first globally unique identifier; accessing contact information of each of one or more other users, to or from whom said at least one communication was detected, in order to access additional private information related to the first user kept by the other users in their contact information, the private information being information held privately by other users of said service; gathering public information associated with the first user from one or more third-party sources outside said service; using the accessible private information, validating that the public information gathered is correctly associated with the first user; adding this validated public information to said provisional user profile; and when the first user joins said service, allocating the provisional user profile to an account belonging to the first user linked to the first globally unique identifier.

According to further aspects there may be provided a computing apparatus and computer program product configured to perform the disclosed method.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the embodiments disclosed herein and to show how the same may be put into effect, reference will now be made, by way of example, to the following drawings in which.

DETAILED DESCRIPTION

In the following description, numerous specific details are set forth to provide a more thorough understanding of the described embodiments. However, it will be apparent to one of skill in the art that the described embodiments may be practiced without one or more of these specific details. In other instances, well-known features have not been described in order to avoid obscuring the described embodiments.

Figure 1:
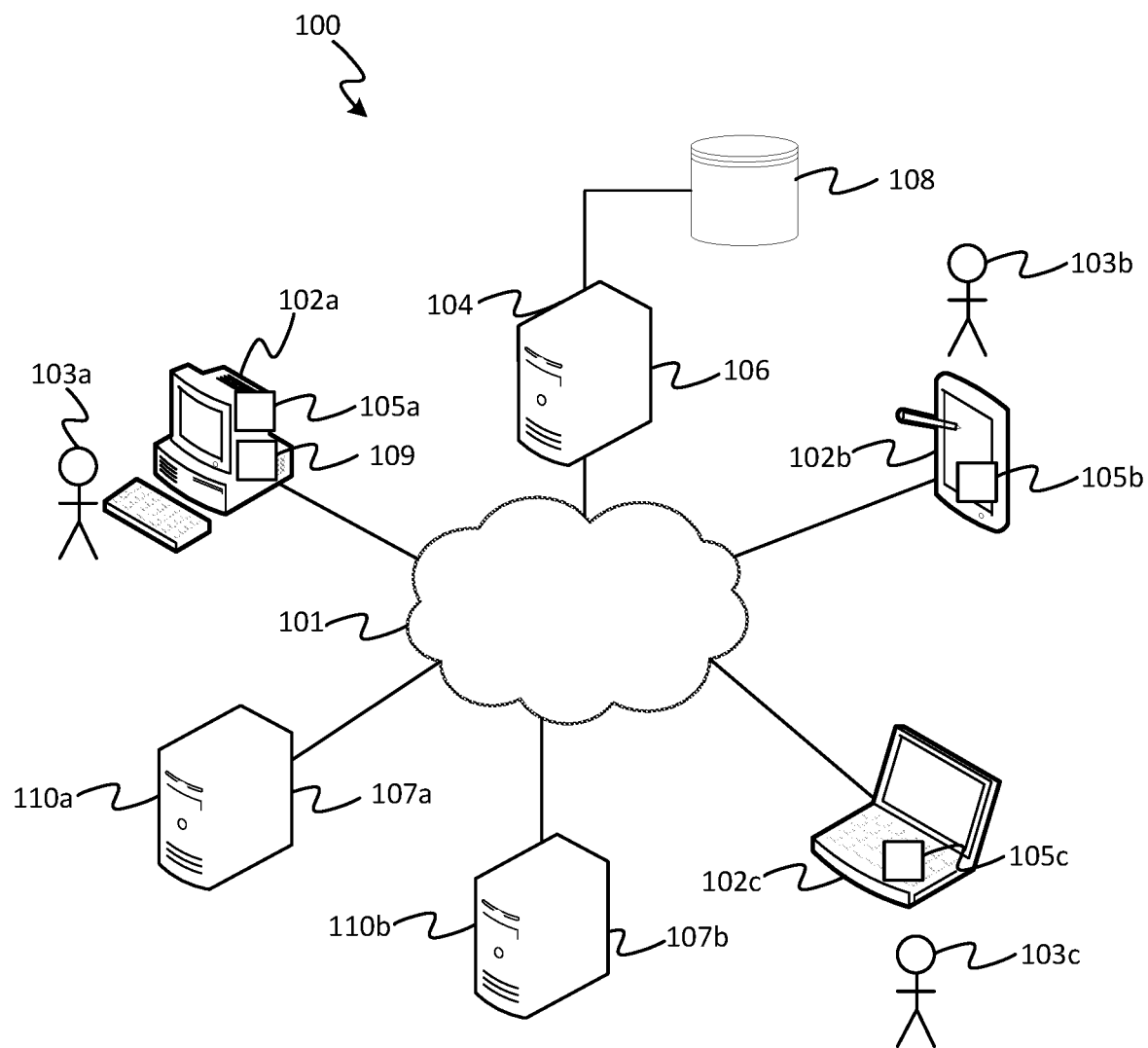
FIG. 1 shows a schematic illustration of a system comprising a network linked to multiple services with multiple users and respective user terminals.

FIG. 1 illustrates an example communication system 100 implemented over a network 101 in accordance with embodiments disclosed herein. The communication system 100 comprises a plurality of user terminals 102 each associated with at least one respective user 103. Each of the user terminals 102 may take any suitable form such as a desktop computer, laptop computer, tablet, smartphone or wearable smart device (e.g. smart watch or smart glasses). Also the different user terminals 102 of the different users 103 need not necessarily all take the same form. The communication system 100 may also comprise a first server 104 comprising one or more physical server units located at one or more geographic sites. Where required, distributed or "cloud" computing techniques are in themselves known in the art. Each of the user terminals 102 and the server 104 is connected to a packet-switched network 101, which may comprise for example a wide-area internetwork such as the Internet, a mobile cellular network such as a 3GPP network, a wired local area network (LAN) such as an Ethernet network, or a wireless LAN such as a Wi-Fi, Thread or 6LoWPAN network, etc. In embodiments the network 101 may comprise a plurality of such networks, e.g. the Internet plus one or more LANs and/or cellular networks via which one or more of the user terminals 102 connect to the Internet. Each of the user terminals 102 and the first server 104 may connect to the network 101 via any suitable network interface (not shown) incorporated in the respective terminal or unit, e.g. a wired modem connecting via a PSTN connection or an Ethernet connection, or a wireless modem connecting via a wireless connection such as a Wi-Fi, Thread or 6LoWPAN connection, etc. The communication system 100 may also comprise a plurality of other servers 110, each comprising one or more physical server units located at one or more geographic sites. Each of the other servers 110 may also be connected to the packet-switched network 101 in any of the ways mentioned above.

The first server 104 may be used to provide a service through which users 103 of user terminals 102 can communicate or at least maintain an account with the ability to communicate using said account. The other servers 110 may be used to provide one or more third party services, each of which may provide one or more of users 103 at user terminals 102 with communication services, as well as other computer or internet based services. These third party services may acquire information from user terminals 102 via network 101.

Each of the user terminals 102 is installed with a respective instance of a communication client application 105, e.g. a VoIP application for conducting voice or video calls, an IM application, an email client, or a collaborative workspace application providing functionality such as document sharing, an electronic whiteboard or screen sharing. In embodiments the client 105 may support multiple such communication types. Each client instance 105 is installed on storage of the respective user terminal 102 and arranged to run on a respective processing apparatus of the respective user terminal 102. The storage in which the client 105 is stored may comprise one or more memory media, e.g. magnetic medium such as a hard drive or an electronic medium such as flash memory or a solid state drive (SSD). The processing apparatus on which it is arranged to run may comprise one or more processors such as CPUs, work accelerator co-processors or application specific processors.

Each of the user terminals 102 may also be installed with a respective instance of a third party application 109 for providing third party services, e.g. social networking, file sharing, internet browsing, etc. In embodiments, multiple third party applications exist on each user terminal 102. Each third party application is installed on storage of the respective user terminal 102 and arranged to run on a respective processing apparatus of the respective user terminal 102.

The first server 104 is a server of a provider of the communication system (e.g. VoIP system), and is arranged to host a corresponding serving application 106. Each instance of the client 105 is installed on and arranged to run on the respective user terminal 102, and is configured so as when thus run to provide the ability to conduct communication events with the instances of the client application 105 on others of the user terminals 102. Such communication events may comprise for example: voice calls (e.g. VoIP calls), video calls (typically also including voice, e.g. VoIP), instant messaging (IM), email, document sharing, electronic whiteboard, screen sharing, or electronic meeting invitations (e.g. calendar events). Each instance of the client 105 is also configured so as when run on its respective terminal 102 to interact, via the network 101, with the serving application 106 on the first server 104 in order for the serving application 106 to assist in conducting the communication events. E.g. the serving application 106 may provide for address look-up, relaying of media, presence information and/or hosting of user profiles.

Similarly, the other servers 110 are servers of one or more third party providers of the third party services, and may be arranged to host corresponding serving applications 107. For each instance of the third party client application 109 installed on and arranged to run on the respective user terminal 102, the third party client application 109 is configured so as when thus run to provide the ability to conduct the third party service. This may involve events with the instances of the respective third party applications on others of the user terminals 102. Each instance of the third party application 109 may also be configured so as when run on its respective terminal 102 to interact, via the network 101, with the serving application 107 on the server 110 in order for the serving application 107 to assist in conducting the third party service's events. E.g. the serving application 107 may provide for address look-up, relaying of media, presence information and/or hosting of user profiles.

In some variants, the server 104 may be replaced with the servers of two or more service providers, with respective serving applications 106 being run on each. This may be the case for example with email, where each user has his/her own respective email provider with corresponding email server. In other scenarios however all the users may use the service of the same provider, as illustrated in FIG. 1, e.g. in the case of a VoIP call or video call with VoIP, where typically all the users use a client 105 of a given provider and the same serving application 106 of that same service provider. It will be appreciated that anywhere herein where certain functionality is attributed to a server 104 of a given provider, then more generally this could be extended to the servers 104 of multiple providers operating together to provide the communication system, e.g. via a standardized or non-proprietary communication protocol.

In further alternative or additional variants, one, some or all of the user terminals 102 may use a remotely-hosted instance of the client application 105, such as a web-hosted instance (not shown), rather than an instance installed and run on the user terminal 102 itself. In this case the client instance is not run, or not entirely run, on the user terminal per se, but rather on a remote server such as the server 104 of the communication service provider. The functionality is then delivered to the respective user terminal 102 via a general purpose client application, e.g. a web browser, on the respective terminal 102. It will be appreciated that anywhere herein where functionality is attributed to an instance of a communication client 105 run or installed on a user terminal 102, this may also be extended to the variant of a remotely hosted client instance such as a web-hosted instance. Similarly, one, some or all of the user terminals 102 may use a remotely-hosted instance of the third party services' application, such as a web-hosted instance (not shown), rather than an instance installed and run on the user terminal 102 itself.

Computer and internet based services generally require a user to create a new account, or provide information to affiliate an existing account with the service provider, in order to begin using the desired service. Typically such a registration or account creation will involve providing a globally unique identifier with which the account is distinguished from all other accounts. By using a pre-existing globally unique identifier such as an email address or phone number, and not one a user is required to make up specifically for the service in question, then the service provider can be sure that creating an account is relatively straightforward for a new user, and that it at least contains some direct contact information.

Most services will associate a user account with a user profile comprising information beyond just the minimum requirements for setting up the user account. This user profile holds all the information about the owner of the user account known to that service provider. This will include at least the seed information for that account, for example the phone number or email address provided to set up the account, but it will likely also comprise other important information. For example, the profile may include the legal name and surname of the user who owns the account, their date of birth, their home address, their nationality, etc. Such information is typically entered directly by the user. Alternatively this information may be pulled from pre-existing accounts for other third party services which the user links to their newly set up account. A proportion of this additional information may be public, although the process of linking a user account to any third party services accounts of the user may require information, often of a private nature, to be entered by the user.

Providers of multiple types of services, for example instant messaging, email, desktop software, etc. collect information about their users from these multiple platforms as a consequence of putting the services into action. Information about any one user may comprise largely the same information from each different service, but there may also be information about the user which is specific to a particular service within the multiple services. Companies which provide more than one service are in the unique position of being able to aggregate this gathered information from each of the respective services they provide. Often the gathered information will be stored as a user profile. The user profile may then be consulted by any one of the multiple services and used to enhance the experience of the user within that respective service. If a user of such a suite or network of services wishes to use a new service provided by the same provider, such a profile can be used to fill in many of the fields required to begin using the new service, if not all of them. However, when a new user of a particular service does not currently have a presence on any of that service provider's suite or network of services, then such a user profile is not available for leveraging to assist in filling in the subsequent user profile of the new user.

A similar approach can be taken to enhancing services supplied to users using third party information. In this case additional information can be provided by third parties having information about the new user, for example from registration, profile, or usage data, due to the new user having an account or presence within that third party's system. However, often this requires the user to provide a certain amount of information to establish this connection in the first place. For example, the new user may be prompted to enter their corresponding account information, e.g. a business networking service username and/or password, a social networking service username and/or password, etc. The new user may then be provided with an experience within the client application 105 which is augmented and enriched with information stored in their user profile which has been retrieved from that third party source. It should be understood that existing users of the client application 105 may also be able to link their client application 105 and corresponding account to an existing third party account in order to improve their experience within the client application 105.

Often a service provider will maintain an account database 108. As well as the basic account information of existing users, information attributed to the user in the form of a profile as well as other information attributed to them may be stored. The attributed information may include email addresses or phone numbers with which a user has communicated, or phone numbers or email addresses a user has searched for in an available address book of the service. The service may then use this information to inform current users of their service when a friend who was not previously contactable via the communication service becomes contactable. For example, when the previously unaffiliated friend signs up for the service, a notification may be sent to the existing user to inform them their friend is now able to be contacted via the service. Such a database 108 therefore comprises contact information, often in the form of globally unique identifiers, which has not yet been used by their associated users and/or owners to create an account for that service. It has been noticed that such a database 108 may be leveraged as a source of potential users of the service. That is to say, the owners of these unused globally unique identifiers may one day choose to become registered users of that service, and at that time they will be requested to populate a user profile and maintain such a profile while they use that service. It may also be possible to differentiate between individuals and organizations in this initial step. For example, by using the communication header or subject line information content it may be possible to categorize the entity being communicated with. This can allow entities such as commercial, companies, marketing, organizations, and spammers, to be treated differently within the provisional profile creation mechanic than individual people who are likely to sign-up to the service and actually need such a profile.

The present disclosure is concerned with avoiding the issue of starting out with no profile when a user starts using a service provider's products, as well as the issue of sparse contact records, and saving the work of setting these up. Similarly, the present disclosure addresses the maintaining of a user profile for an existing user of the service. These can be time consuming tasks, which the user 103a may well have already done multiple times for other services and providers. According to the disclosed techniques, this is achieved in part by creating a provisional user profile. This is done by allowing the user to use the provisional user profile information as a default user profile, and the same processes can be used to keep the user profile up to date e.g. providing effortless profile and contact management. The seed information around which the provisional user profile is built may be used as a lookup value against public search resources (e.g., a business networking service, social networking service, an online application suite, etc.). Thus a form of crowdsourcing information can be used to build up a provisional user profile of the owner of the seed information.

The provisional user profile may use a globally unique identifier, currently unused within the service, as seed information, around which the provisional user profile can be built. The provisional profile may then be populated with information gathered from a number of sources, both private and public. Through regular scanning of publicly available sources of profile information (e.g. business networking service, social networking, etc.), a personal or business profile can be built up for each of the external email addresses and/or phone numbers which have been provided for lookup by existing users, for example in 'Friend Finder' scenarios, and stored in the database 108 of the service.

Figure 2:
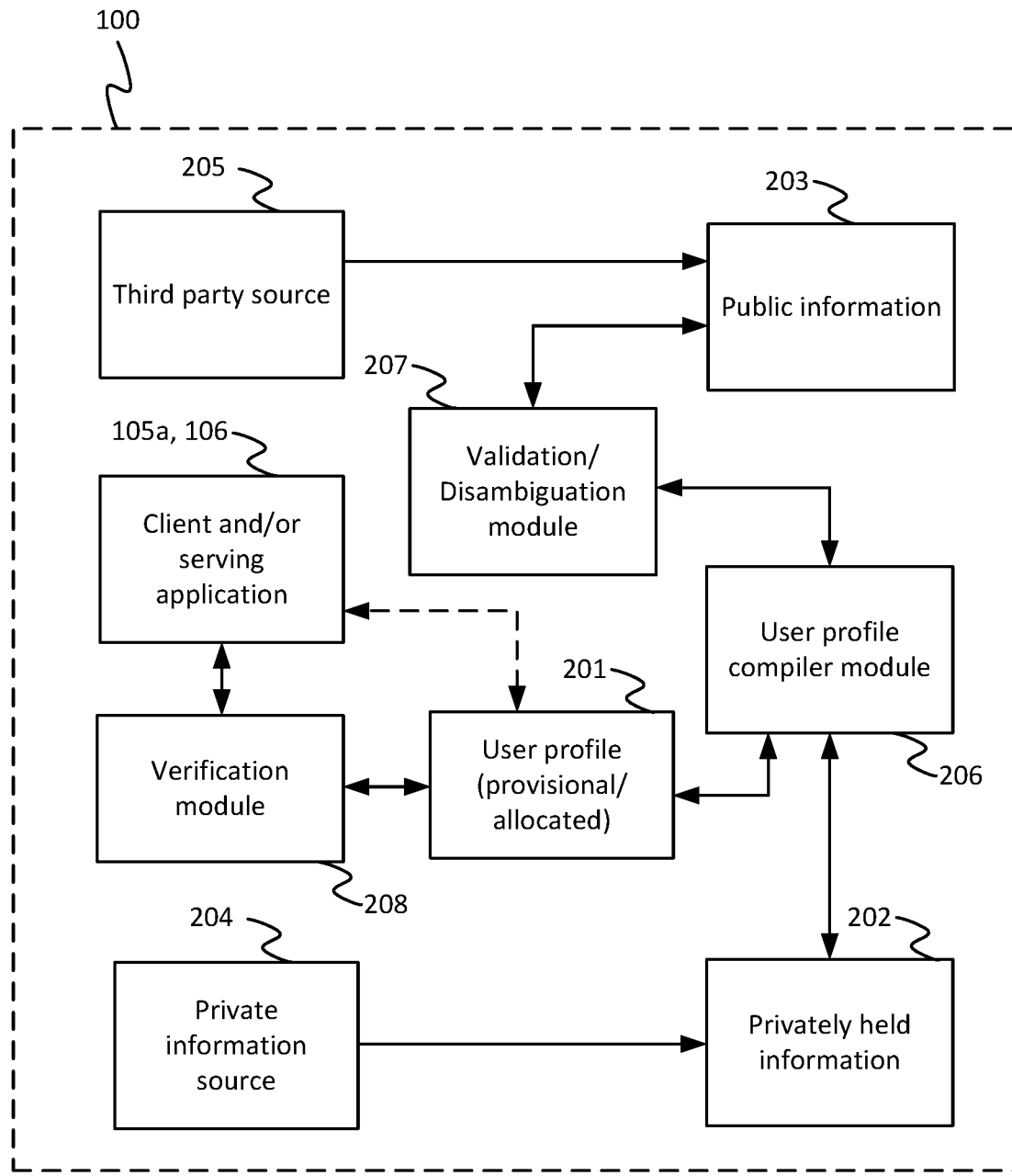
FIG. 2 shows a schematic block diagram of the system.

FIG. 2 shows a functional block diagram of the communication system 100 for the creation of a provisional user profile using private and public information, the validation and disambiguation of the public information from third party sources, the allocation of the provisional user profile, the verification of the user claiming the provisional user profile, and the updating of the user profile.

Turning to FIG. 2, the communication system comprises access to a number of third party sources 205 from which public information 203 is obtained. These may be implemented as part of the services provided by the server(s) 110 other than the first server 104. In the context of the present disclosure public information 203 is information that can be accessed by a member of the public or a company outside of the service provided by the first server 104 (outside the service for which the provisional account is being created). For example, the public information 203 may be obtained from a simple search of the internet and screen scraped from the returned results. The public information 203 may also be behind a paywall, for example within a database or system of a third party. Examples of information which may be public comprises: an avatar image, a profile image, an employer, an address, an age, a birthday, a school, a hometown, a location, an interest, a hobby, an associate, an employment history, etc. Information that can be purchased by any person is not considered to be private, as this information has been volunteered and provided for such use. In such cases, information with other criteria of release such as being a member of the third party service which holds the information in order to obtain it, for example having a social networking account and being a specific person's friend, is considered to be a type of private information. Examples of third party sources 205 are: a social network service, a retail service, a marketing service, a market research service, a government service, a banking service, an internet service provider, a cellular network service, etc.

The provisional user profile 201 of the present invention may also comprise an amount of private information 202 (also referred to herein as privately held information). By private information it is meant that this information is privately held. That is to say the information is held in a privately accessed location and not a location or source which is available publically (i.e. information available only within the service provided by the first server 104, e.g. available within the service for which the provisional account is being created). The private information is also not necessarily private from the profile's point of view (e.g. the information is not necessarily private within the profile such that it is not visible to a viewer of the profile).

The communication system comprises access to a number of private information sources 204 from which the private information 202 is obtained. A private source of information 204 may exist with a number of levels or degrees of privacy. The most private of private information 202 a service 105, 106 may have access to is the information provided directly to that service by its current users 103b 103c for use by that service. This may also include any information present on the internal storage of a user device 102 which is available for an application 105 of the service to access. The private information 202 can thus be retrieved from the contact information held by current users 103b, 103c of the communication service, and may therefore be referred to as crowdsourced information. The crowd of current users 103b, 103c with such information may be found using the globally unique identifier seed information and its presence in these current user's contact information. That is, the globally unique identifier seed information around which the provisional profile is being built. The crowdsourced private information 202 may not only comprise the seed information itself, but may also include for example, a legal name (e.g. all parts of a person's legal name), a first name and/or surname of the owner of the identifier, an email address, a phone number (e.g. home, mobile, etc.), a company name, etc. From this private information 202 it may be possible to determine other information, such as an estimated location from the area code of a home phone number, etc.

By crowdsourcing information in this way, a provisional user profile 201 may be built up around the globally unique identifier currently unused within the communication service, with the assistance of any private information 202 obtained from current users 103b, 103c of the communication service. The private information 202 is likely to be more reliable than public information 203 from third party sources 205 as it is likely being used and kept up to date by the current user 103b, 103c in whose contact information it exists.

It should be noted that the private information 202 held by other users 103b, 103c is not gathered into a central place (e.g. it is not added to the user profile of the first user as such). The private, or privately held, information 202 may be used by the service to build the provisional profile of the user. For example by reference to the private information, e.g. for the purposes of searching for public information, or for the purposes of validating or disambiguating public information returned in a search. That is to say, the use of the privately held information may only comprise a comparison of values found publicly to the values held privately which can be viewed.

Another level of private information 202 exists when considering third party sources of information. As mentioned above, this may comprise information where additional criteria must be fulfilled for release of that information. For example, access may only be provided to a member of the third party service which holds the information. A specific example is having a social networking account and being a specific person's friend before certain information is accessible. Such implicitly private information may be added to the user profile only once permission or access is granted by the user themselves, e.g. once the provisional user profile has been allocated and the third party account is linked.

Obtaining public information 203 is a known area exploited by some service providers to target potential customers. For example, a way to gather information about a person can be to search for them on the Internet, and employ a technique known as screen scraping to gather the information returned. This includes lifting all of the information from the returned sources, and compiling it into a single information cache about that user. However, in this case the only information which is available is public information which is returned from the search. This returned information may be incorrect, a compilation of results for a number of different people who match the search criteria, and it may be incorrectly categorized when compiled e.g. stating place of birth instead of hometown etc. Therefore creating a provisional profile using publicly sourced information can be somewhat unreliable.

A specific example of the unreliability of public information is where third party databases are leveraged. For example, searching for public information within a social networking service may return a number of accounts as results for the search criteria, e.g. with the same common name. It can be difficult to determine which account or profile is the one belonging to the new user in question, that is the user whose provisional user profile is being created. Typically this ambiguity between results is avoided by asking a new user to manually link such a public third party account to their new communication service account, or select their account from the plurality of results found. However, this forgoes completing the provisional user profile to a greater extent, and involves just waiting for the user to join the service.

To address such issues or similar, according to embodiments disclosed herein the communication system 100 may comprise a validation and/or disambiguation module 207.

This may be implemented as part of the service provided by the first server 104 (that of the communication service for which the provisional profile is being created). The disambiguation module 207 may be configured to disambiguate different instances of public information 203 from one another if more information is known by which to differentiate them. Similarly, the validation module 207 may be configured to validate a single instance of public information as correctly associated with the prospective new user in question if more information can be checked against the record than just the original search criteria. One way of disambiguating or validating one or more instances of public information 203 obtained from a third party source is to use the available private information 202 for the prospective new user to cross check the public information 203. For example, any private information 202 already contained in the provisional user profile 201, or private information which can be accessed e.g. information obtained from the contact information of existing users of the service who communicate with the prospective new user, can be compared with the public information 203 obtained to ensure the information relates to the same person. This serves as a more reliable form of disambiguation as the private information 202 such as contact information (e.g. phone numbers, email addresses etc.) is more likely to be correct. Similarly the private information 202 is more likely to comprise globally unique identifiers which will more reliably differentiate the public information 203 which is correctly associated with the prospective new user from public information 203 which is not correctly associated with the new user. This is because by their very nature globally unique identifiers are distinct for different owners. That is to say, if at any time there is more than one result from public search results, private information 202 taken from those existing users' contact information can be used to validate the public information 203. The contact data would not be used explicitly, but could be used to validate or disambiguate the public information 203.

For example, if a search of a public social network returns a number of profiles belonging to a John Doe, privately sourced information 202 available for the new user called John Doe (for example, a phone number or email address from a contact), may be used to select which 'John Doe' social network profile can be correctly associated with the new user. As a result, information from the correct public profile of John Doe can be added to the provisional user profile 201 for new user John Doe.

Similarly, the private information 202 available about new user John Doe may provide a provisional contact list for John Doe. That is a list comprising names of existing users 103b 103c of the communication service 105 who have John Doe's phone number in their respective contact information. This provisional contact list of available private information 202 may be compared at the validation/disambiguation module 207 to the public contacts 203 of public social network profiles returned in a search. Thus, by comparing the two contact lists it may be possible to determine which 'John Doe' public social network profile belongs to the same John Doe of the provisional user profile 201.

It should be appreciated that there are many different types of private information 202 which may be used to check the validity of public information 203, and similarly to disambiguate a plurality of public information 203 instances. The above cases are merely provided as examples of this process.

The user profile 201 provides more information for scenarios like caller ID when calls come into the user 103a from the communication service, email sender information, and enrichment of the user's contacts.

When a user 103a eventually joins the communication service 105a, 106 the provisional user profile 201 is available for the new user to claim. This claiming of the profile requires the new user 103a to prove that they are correctly entitled to the user profile 201. This requires user 103a to verify their identity. Such verification can be performed at a verification module 208 using the information within the user profile 201. Typically upon creation of an account a new user 103a will enter a globally unique identifier such as an email address or a phone number etc. This globally unique identifier is then independently contacted by the service 106 sending a confirmation communication. The new user is then either questioned on the contents of the communication, e.g. asked to enter a code sent to them via the globally unique identifier they entered, or asked to directly respond to the confirmation communication sent. The confirmation communication may comprise a control, e.g. a button, or other selectable feature, which the user can actuate in order to confirm receipt of the communication. This verification process confirms that the person creating the account does in fact own the information they are providing. For example, this verifies that the new user 103a does in fact have access to the email account of the email address they have provided, or the phone 102a for which they have entered the phone number. This helps to prevent the blocking of genuine account creation attempts, identity fraud, and general abuse of the communication system and service.

In an embodiment of the present invention an extra level of validation may be implemented. For example, instead of simply sending a verification communication to the globally unique identifier provided by the user 103a attempting to claim the associated provisional user profile 201, a communication can be sent by the verification module 208 to an alternative globally unique identifier also found in the provisional user profile 201. For example, if the prospective user enters a mobile phone number associated with a provisional user profile 201 of the communication service, the verification module 208 may send a verification communication to an email address found within that provisional user profile 201. This may be done instead of sending a verification communication to the globally unique identifier provided by the user claiming the provisional user profile. Additionally, a communication may also be sent to the globally unique identifier provided by the user claiming the provisional user profile 201 to inform them of which method the service has used to verify their identity. The user may then navigate to that communication method to verify their identity.

This allows the email and/or phone number owner to join the service and verify ownership of their account, and then start out with a pre-built user profile. From this they can then edit the user profile, delete the user profile, etc. The verified user may then manually link their user profile to other sources, like a business networking service, and have the profile comprise more implicitly private information. The service can continue to use public sources to keep the profile up to date, thereby removing the need for the owner to maintain it themselves.

In an embodiment, the verification communication may comprise a code or question or other piece of information based on which a specific response at the client application 105a of the communication service 106 can be expected. Alternatively, or additionally, the verification communication may comprise an actuator which the recipient may actuate in order to acknowledge the verification communication and their ability to view it.

The provisional user profile 201, once created, may require updating if information at any of the sources 205, 204 is changed prior to the provisional profile being claimed. By updating the provisional user profile 201 a user claiming the provisional user profile will not be presented with a provisional user profile 201 which was created so long ago that much of the information has since changed and is therefore wrong, requiring the user 103a to spend time correcting it. Similarly an allocated user profile 201 may require ongoing maintenance by the user 103a in order to update the information therein. Often user profiles contain a degree of incorrect information which increases over time if the user does not engage with the service and their profile in order to update it. These updates can be time consuming for the user when they are presented with a lot of incorrect information or finally get around to updating their outdated user profile. This can be especially time consuming if the user is also required to make changes to information in other profiles with other service providers.

Embodiments disclosed herein minimize this burden on the user by periodically revisiting the third party and private sources of information 204, 205 used to compile the user profile 201 (in its provisional or allocated state) and determining if any information has changed. This determination may be based on how many different sources 204 205 have changed the same item of information in the same way. That is to say there may be a threshold number of sources 204, 205 which must be determined to have changed a particular item of information before the change will be mirrored by the user profile 201 of the communication service. The threshold may comprise one or more sources, two or more sources, three or more sources, etc. The threshold may be different depending on the types of source showing the change of information. For example, the threshold may be set higher for the third party sources 205 than the private sources 204. E.g. the changes to the user profile 201 may be automatically made only when three or more third party sources 205 are determined to show the same change in public information 203. Whereas changes to the user profile 201 may be made only when two or more private sources 204 are determined to show the same change in information 202. If the determination that information has changed is based on changes to privately held information 202 at private sources 204, the change to the profile 201 may only be carried out when the user positively responds to a user prompt to "accept" the inferred profile information determined in this way. For example, the privately held information determined to have changed may comprise contact information of one or more other users of the service.

Updating the user profile 201 using private information 202 may comprise periodically checking information like phone numbers and email addresses in the contact information of the other users 103b 103c of the communication service who communicate with the user 103a. In this way the private information 202 can be crowdsourced to corroborate its accuracy. Updating the user profile using 201 public information 203 may comprise periodically checking the third party sources 205 previously determined to be correctly associated with user 103a, and updating the user profile 201 when the threshold number of sources 205 show the same public information 203 change. By using a threshold to determine when a change in source information should be mirrored in the user profile 201, random errors can be accounted for and not erroneously migrated into the user profile 201. For example, if another user 103b 103c of the communication service accidentally changes the phone number of the user 103a, the user profile 201 will not be changed to mirror this single change. When the implemented threshold number of changed sources is reached it may be more likely that the user 103a has changed their phone number and failed to change it themselves in their user profile 201 yet, therefore the crowdsourced changed information is more likely to be correct and safe to use. The third party sources 205 and public information 203 used to check for changes of information may be from those sources already determined to be correctly associated with the user 103a.

Automatic updates may require user 103a approval prior to the determined changes of information being mirrored in the user profile 201. This may involve the user 103a being prompted, e.g. by receiving a notification, to approve the change of information prior to the change of information being applied to their user profile 201.

The prompting of the user 103a for approval may comprise showing the user a private version of the user profile 201 where the change of information has been implemented, but requiring approval prior to the same change of information being applied to a public version of the user profile 201.

Figure 3:
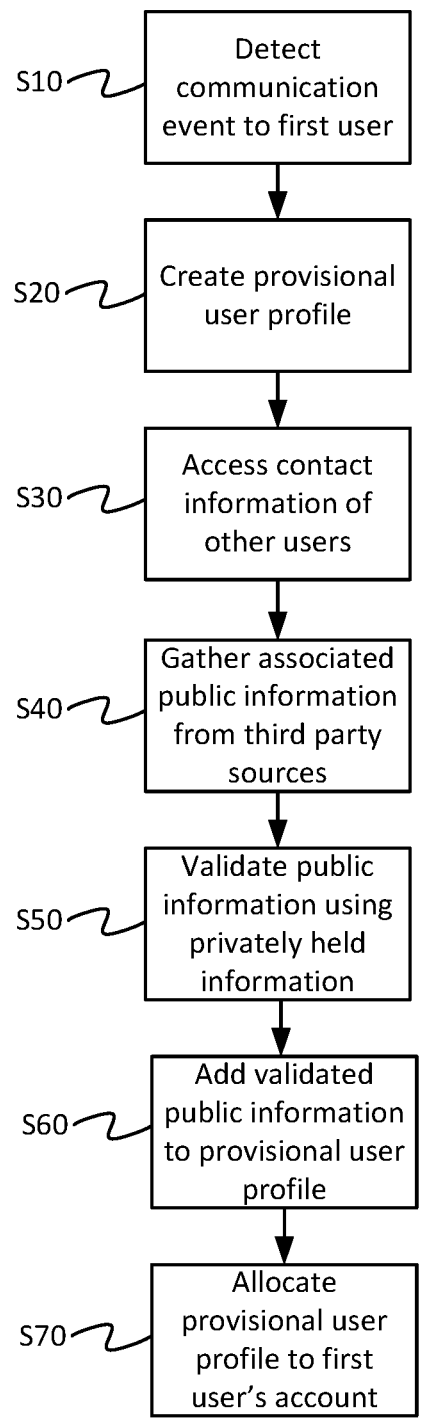
FIG. 3 shows a flow chart of the process of creating a provisional user profile.

FIG. 3 is a flow chart showing an example process in accordance with embodiments disclosed herein.

The process begins at step S10 with the detection of a communication between one or more existing users 103b of the communication service and a first user 103a who is not currently a member of the communication service. The first user 103a does not yet have an instance of the client application 105 installed on their device 102a, and therefore the communication service is not able to collect information about the first user 103a directly. The communication service is made aware of the existence of the first user 103a by collecting data from the existing users 103b contacting the first user 103a. This data is in the form of a globally unique identifier such as an email address or phone number the existing user 103b used to contact the first user 103a, or by the existing user 103b entering contact information into a look up function of the communication service while attempting to communicate with the first user 103a. This data may be stored at storage 108 within the communication system, or in a distributed fashion throughout the system, and can be accessed by the user profile compiler module 206. The data may be in the form of a reference list comprising the users in the system who have interacted with the first user via this identifier.

In response, the process then moves onto step S20, where a provisional user profile 201 is created by the user profile compiler module 206 and linked to the globally unique identifier of the first user 103a. Creation of the user profile is thereby triggered by interactions (e.g. making calls, sending messages, etc.) with the identifier (e.g. email address, phone number, etc.). The use of the globally unique identifier as seed information for the provisional user profile 201 acts as an important anchor value within the communication service, and also provides private information 202 which can be used to tell other information sources apart.

At step S30, the contact information of the existing users 103*b* 103*c* of the communication service, private information sources 204, is accessed by the user profile compiler module 206. These existing users 103*b* 103*c* are identified by their possession of the globally unique identifier of the first user 103*a* within their contact information. By accessing all of the corresponding contact information about the first user 103*a* in the possession of the existing users' 103*b* 103*c* at private information sources 204, additional private information 202 may be obtained about the first user 103*a*.

Step S40 of the process comprises gathering public information 203 by the user profile compiler module 206 associated with the first user 103*a*. This public information 203 is gathered from one or more third party sources 205. Examples of third party sources 205 have been discussed above.

At step S50 the private information 202 may be used to validate the search results for public information 203. Any single item of the information already known about the first user 103*a* may be used as a reference value with which to search the third party sources 205 for associated public information 203. Additional information for the first user 103*a* can be accessed by the user profile compiler module 206 from the contact information of other users of the service. For example this may include information such as the first user's 103*a* legal name, date of birth, or additional globally unique identifiers, e.g. a phone number if the first user's 103*a* email address is the seed information, and vice versa. Further, multiple items of private information can be used to confirm the validity of the initial association via the validation/disambiguation module 207. Examples of this validation process are discussed above.

The validated public information is added by the user profile compiler module 206 to the provisional user profile 201 of the first user 103*a* in step S60. In this way the provisional user profile 201 can gather substantial amounts of public information 203 about the first user 103*a* which can be confidently determined to be linked to the first user's 103*a* private information 202.

In step S70 the process moves to the step of allocating the provisional user profile 201 to a user account. That is, when the first user 103*a* eventually joins the communication service and creates a user account they may effectively claim the provisional user profile 201 by using at least one of the globally unique identifiers within the provisional user profile 201 to create their account. The provisional user profile 201 may then be allocated as the user profile for the user of this account, the first user 103*a*.

It will be appreciated that the above embodiments have been disclosed by way of example only. Other variants and/or applications may become apparent to the person skilled in the art once given the disclosure herein.

More generally, according to one aspect disclosed herein there may be provided a method of generating a provisional user profile for an account in an account database, the accounts database comprising accounts of a communication service that is implemented over a network, wherein each account is linked to at least one globally unique identifier, the method comprising: detecting at least one ingoing or outgoing communication to or from a first globally unique identifier of a first user, the first globally unique identifier not already linked to an account of said service; in response to said detection, creating a provisional user profile for the first user linked to the first globally unique identifier; accessing contact information of each of one or more other users, to or from whom said at least one communication was detected, in order to access additional private information related to the first user kept by the other users in their contact information, the private information being information held privately by other users of said service; gathering public information associated with the first user from one or more third-party sources outside said service; using the accessible private information, validating that the public information gathered is correctly associated with the first user; adding this validated public information to said provisional user profile; and when the first user joins said service, allocating the provisional user profile to an account belonging to the first user linked to the first globally unique identifier.

In embodiments, upon the first user joining the service and attempting to claim the provisional user profile, sending a confirmation communication to the first user via the first globally unique identifier now linked to the provisional user profile.

In embodiments, the confirmation communication comprises a control configured to be actuated by the first user, wherein said actuating of the control returns a signal to said service confirming ownership of the first globally unique identifier and thereby allowing the allocation of the provisional user profile.

In embodiments, the one or more third party sources comprise one or more of: a social network service, a retail service, a marketing service, a market research service, a government service, a banking service, an internet service provider, or a cellular network service.

In embodiments, the public information available from the public source comprises multiple instances of public information potentially associated with the first user, and wherein the method comprises, based on the accessible private information, disambiguating instances of the public information correctly associated with the first user from other instances of public information not correctly associated with the first user based on the accessible private information.

In embodiments, the disambiguation is performed by comparing the contact information of the first user as found in the contact information of the other users with whom the first user has communicated, to contact information associated with the multiple instances of public information.

In embodiments, the disambiguation is performed by comparing: private information in at least one of the other users' contact information, and the multiple instances of public information, in order to determine which instance of public information has the most contacts in common.

In embodiments, updating the user profile of the first user in response to determining that information associated with the first user has changed.

In embodiments, the information determined to have changed is private information comprising contact information of the one or more other users.

In embodiments, the private information comprises one or more of: a phone number, an email address, a first name, a last name, a company name.

In embodiments, the information determined to have changed is public information already associated with the first user in the user profile of the first user.

In embodiments, the public information comprises one or more of: an avatar image, a profile image, an employer, an address, an age, a birthday, a school, a hometown, a location, an interest, a hobby, an associate, an employment history.

In embodiments, the first user is prompted to approve said change of information prior to the changed information being applied to the user profile of the first user.

In embodiments, the first user is prompted to approve said change of information before applying said change to a public version of the user profile, but after the determined change has been applied to a private version of the user profile viewable by at least the first user.

In embodiments, the profile information is determined to have changed only when more than a threshold number of sources are determined to have changed said information associated with the first user.

In embodiments, the threshold number of sources is at least two.

In embodiments, the service comprises any one, more or all of: an email service, a VoIP service, an instant messaging service, a screen sharing service, a virtual whiteboard, a word processing application with capability to compose word-processing documents and to store or publish the word-processing documents over the network, a spreadsheet application with capability to compose spreadsheets and to store or publish the spreadsheets over the network, a slideshow application with capability to compose slideshows and to store or publish the slideshows over the network.

In embodiments, said network comprises the Internet.

According to another aspect disclosed herein, there is provided a computer program being embodied on computer-readable storage and configured so as when run one or more processors to perform operations in accordance with any of the above methods.

According to another aspect disclosed herein, there is provided computer apparatus comprising memory and one or more processors, the memory storing code arranged to run on the one or more processors and configured so as when thus run to perform operations.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Generally, any of the functions described herein (e.g. the functional modules shown in FIG. 2 and the functional steps shown in FIG. 3) can be implemented using software, firmware, hardware (e.g., fixed logic circuitry), or a combination of these implementations. The modules and steps shown separately in FIGS. 2 and 3 may or may not be implemented as separate modules or steps. The terms "module," "functionality," and "component" as used herein generally represent software, firmware, hardware, or a combination thereof. In the case of a software implementation, the module, or functionality represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of generating a provisional user profile for an account in an account database, the account database comprising accounts of a communication service that is implemented over a network, wherein each account is linked to at least one globally unique identifier, the method comprising:
   detecting at least one ingoing or outgoing communication to or from a first globally unique identifier of a first user, the first globally unique identifier not already linked to an account of said service;
   in response to said detection, creating a provisional user profile for the first user linked to the first globally unique identifier;
   accessing contact information of each of one or more other users to or from whom said at least one communication was detected in order to access private information related to the first user kept by the one or more other users in their contact information, the private information being information held privately by the one or more other users of said service;
   gathering public information associated with the first user from one or more third-party sources outside said service;
   using the accessible private information, validating that the public information gathered is correctly associated with the first user;
   adding the validated public information to said provisional user profile; and
   when the first user joins said service, allocating the provisional user profile to an account belonging to the first user linked to the first globally unique identifier.

2. The method of claim 1, wherein the method comprises: upon the first user joining the service and attempting to claim the provisional user profile, sending a confirmation communication to the first user via the first globally unique identifier now linked to the provisional user profile.

3. The method of claim 2, wherein the confirmation communication comprises a control configured to be actuated by the first user, wherein said actuating of the control returns a signal to said service confirming ownership of the first globally unique identifier and thereby allowing the allocation of the provisional user profile.

4. The method of claim 3, wherein the one or more third-party sources comprise one or more of: a social network service, a retail service, a marketing service, a market research service, a government service, a banking service, an internet service provider, or a cellular network service.

5. The method of claim 1, wherein the public information available from the public source comprises multiple instances of public information potentially associated with the first user, and wherein the method comprises, based on the accessible private information, disambiguating instances of the public information correctly associated with the first user from other instances of public information not correctly associated with the first user based on the accessible private information.

6. The method of claim 5, wherein the disambiguation is performed by comparing the contact information of the first user as found in the contact information of the other users with whom the first user has communicated, to contact information associated with the multiple instances of public information.

7. The method of claim 5, wherein the disambiguation is performed by comparing:
   private information in at least one of the other users' contact information, and
   the multiple instances of public information,
   in order to determine which instance of public information has the most contacts in common.

8. The method of claim 1, wherein the method comprises updating the user profile of the first user in response to determining that information associated with the first user has changed.

9. A method of generating a provisional user profile for an account in a database comprising accounts of a communication service that is implemented over a network, the method comprising:
   detecting a communication between a first user not linked to an account of the communication service and a second user linked to an account of the communication service;
   in response to detecting the communication, creating a database record representing a provisional user profile for the first user not linked to an account of the communication service in the database;
   collecting private information of the first user by accessing contact information of the second user held at the communication service and adding the collected private information to the created database record representing the provisional user profile;
   collecting public information potentially corresponding to the first user from a source external to the communication service;
   upon collecting the public information, using the collected private information to validate that at least a portion of the collected public information correctly corresponds to the first user;
   upon validating that the at least portion of the collected public information correctly corresponds to the first user, adding the validated at least a portion of the collected public information to the database record representing the created provisional user profile; and
   subsequently, when the first user joins the communication service, allocating the database record representing the provisional user profile having the collected private information and the validated at least a portion of the public information to an account belonging to the first user.

10. The method of claim 9 wherein:
    the collected private information includes a globally unique identifier of the first user; and
    using the collected private information to validate includes using the globally unique identifier of the first user to ensure that the collected public information correctly corresponds to the first user.

11. The method of claim 9 wherein:
    the collected private information includes a globally unique identifier of the first user;
    the collected public information includes multiple profiles corresponding to a name of the first user; and
    using the collected private information to validate includes using the globally unique identifier of the first user to select one of the multiple profiles as correctly corresponding to the first user.

12. The method of claim 9 wherein:
    the collected private information includes a provisional contact list of the first user;
    the collected public information includes multiple profiles corresponding to a name of the first user, each of the multiple profiles having a corresponding public contact list; and
    using the collected private information to validate includes, comparing the provisional contact list of the collected private information with the public contact list of the collected public information to select one of the multiple profiles as correctly corresponding to the first user.

13. The method of claim 9, further comprising sending a confirmation to the first user linked to the provisional user profile upon the first user joining the service.

14. The method of claim 9, further comprising: sending, to the first user, a control configured to be actuated by the first user, wherein actuating the control returns a signal to the communication service confirming ownership of the provisional user profile.

15. The method of claim 9 wherein the source external to the communication service comprises a social network service, a retail service, a marketing service, a market research service, a government service, a banking service, an internet service provider, or a cellular network service.

16. A computing device, comprising:
    a processor; and
    a memory operatively coupled to the processor, the memory having instructions executable by the processor to cause the computing device to:
    upon detecting a communication between a first user not linked to an account of the communication service and a second user linked to an account of the communication service, create a database record representing a provisional user profile for the first user in a database;
    access the database to collect private information of the first user from contact information of the second user held at the communication service;
    access a source external to the communication service to collect public information potentially corresponding to the first user;
    validate, using the collected private information, that at least a portion of the collected public information correctly corresponds to the first user;
    upon validating that the at least a portion of the collected public information correctly corresponds to the first user, modify data of the created database record representing the provisional user profile to include the validated at least a portion of the collected public information; and subsequently, when the first user joins the communication service, allocate the created provisional user profile having the validated at least a portion of the collected public information to an account belonging to the first user.

17. The computing device of claim 16 wherein:
the collected private information includes a globally unique identifier of the first user; and
to validate includes to validate, using the globally unique identifier of the first user, to ensure that the collected public information correctly corresponds to the first user.

18. The computing device of claim 16 wherein:
the collected private information includes a globally unique identifier of the first user;
the collected public information includes multiple profiles corresponding to a name of the first user; and
to validate includes to validate, using the globally unique identifier of the first user, to select one of the multiple profiles as correctly corresponding to the first user.

19. The computing device of claim 16 wherein:
the collected private information includes a provisional contact list of the first user;
the collected public information includes multiple profiles corresponding to a name of the first user, each of the multiple profiles having a corresponding public contact list; and
to validate includes to compare the provisional contact list of the collected private information with the public contact list of the collected public information to select one of the multiple profiles as correctly corresponding to the first user.

20. The computing device of claim 16 wherein the source external to the communication service comprises a social network service, a retail service, a marketing service, a market research service, a government service, a banking service, an internet service provider, or a cellular network service.

* * * * *